United States Patent
Talma et al.

(10) Patent No.: US 9,428,631 B2
(45) Date of Patent: Aug. 30, 2016

(54) IRON-BASED ACCELERATOR FOR CURING RESINS

(75) Inventors: Auke Gerardus Talma, Bathmen (NL); Frederik Willem Karel Koers, Epse (NL); Johannes Martinus Gerardus Maria Reijnders, Epe (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/423,197

(22) PCT Filed: Aug. 29, 2012

(86) PCT No.: PCT/EP2012/066777
§ 371 (c)(1),
(2), (4) Date: Feb. 23, 2015

(87) PCT Pub. No.: WO2014/032710
PCT Pub. Date: Mar. 6, 2014

(65) Prior Publication Data
US 2015/0203656 A1   Jul. 23, 2015

(51) Int. Cl.
*C08K 5/098* (2006.01)
*C08K 3/08* (2006.01)
*C08K 5/56* (2006.01)
*C08K 5/07* (2006.01)
*C08K 5/00* (2006.01)

(52) U.S. Cl.
CPC ............. *C08K 5/098* (2013.01); *C08K 3/08* (2013.01); *C08K 5/0091* (2013.01); *C08K 5/07* (2013.01); *C08K 5/56* (2013.01); *C08K 5/0025* (2013.01); *C08K 2003/0856* (2013.01)

(58) Field of Classification Search
CPC .... C08K 5/0025; C08K 5/0091; C08K 5/07; C08K 5/098; C08K 5/56; C08K 3/08; C08K 3/24; C08K 2003/0856
See application file for complete search history.

(56) References Cited

U.S. PATENT DOCUMENTS

| | | |
|---|---|---|
| 4,309,511 A | 1/1982 | Jefferson et al. |
| 4,348,498 A | 9/1982 | Kamio et al. |
| 4,524,177 A | 6/1985 | Klöker et al. |
| 4,607,082 A | 8/1986 | McGinniss |
| 2008/0207841 A1* | 8/2008 | Koers ............ C08F 4/40 525/418 |
| 2014/0005342 A1 | 1/2014 | Reijnders et al. |
| 2014/0005343 A1 | 1/2014 | Koers |
| 2014/0011966 A1 | 1/2014 | Reijnders et al. |

FOREIGN PATENT DOCUMENTS

| | | |
|---|---|---|
| EP | 0043484 A1 | 6/1981 |
| GB | 1 452 460 A | 10/1976 |
| JP | S53-133288 A | 11/1978 |
| JP | S57-147509 A | 3/1981 |
| JP | S57-44615 A | 3/1982 |
| JP | S57-128715 A | 8/1982 |
| WO | 90/12825 A1 | 11/1990 |
| WO | 2006/090911 A1 | 8/2006 |
| WO | 2006/128816 A1 | 12/2006 |
| WO | 2008/003492 A1 | 1/2008 |
| WO | 2008/003493 A1 | 1/2008 |
| WO | 2008/003497 A1 | 1/2008 |
| WO | 2008/003500 A1 | 1/2008 |
| WO | 2008/003501 A1 | 1/2008 |
| WO | 2008/119783 A1 | 10/2008 |
| WO | 2011/083309 A1 | 7/2011 |
| WO | 2011/157673 A1 | 12/2011 |

OTHER PUBLICATIONS

Stava et al; Properties of metallocene complexes during the oxidative crosslinking of air drying coatings; ScienceDirect; Journal of Physics and Chemistry of Solids 68 (2007) 799-802.
Dibutyl phosphate data sheet, Sigma-Aldrich, retrieved Sep. 29, 2014, www.sigmaaldrich.com/catalog/product/aldrich/68572?lang=en&region=US.
Diethylene glycol monoethyl ether data sheet, Sigma-Aldrich, retrieved Sep. 29, 2014, www.sigmaaldrich.com/catalog/product/sia!/537616?lang=en® ion=US.
N, N Diethylacetoacetamide data sheet, Sigma-Aldrich, retrieved Sep. 29, 2014, www.sigmaaldrich.com/catalog/product/aldrich/690945?lang=en&region=US.
International Search Report for PCT/EP2012/066777 dated May 7, 2013.

* cited by examiner

*Primary Examiner* — Robert Jones, Jr.
(74) *Attorney, Agent, or Firm* — Alice C. Su

(57) ABSTRACT

Accelerator solution suitable for forming a redox system with peroxides, comprising (i) an iron compound selected from iron carboxylates, iron 1,3-dioxo complexes, and iron dicylcopentadienyl complexes, (ii) a compound of a second transition metal; the weight ratio of iron:second transition metal being in the range 3:1 to 200:1, with the proviso that the accelerator solution is essentially free of ascorbic acid.

14 Claims, No Drawings

IRON-BASED ACCELERATOR FOR CURING RESINS

This application is a national stage filing under 35 U.S.C. §371 of PCT/EP2012/066777, filed Aug. 29, 2012, the contents of which are incorporated herein by reference in their entirety.

The present invention relates to an accelerator solution suitable for forming a redox system with peroxides, a pre-accelerated resin composition comprising an unsaturated polyester resin or vinyl ester resin, and a two-component composition comprising said pre-accelerated resin composition.

Redox systems can be applied for resin curing. Conventional redox systems comprise an oxidizing agent (e.g. a peroxide) and a soluble transition metal ion as accelerator. The accelerator serves to increase the activity of the oxidizing agent at lower temperatures and, consequently, to speed up the cure.

Accelerator systems can be added to the resin to be cured in different ways. One method involves the addition of the individual accelerator ingredients to the resin, before the peroxide is added. This can be done just in advance of peroxide addition or days or weeks before that. In the latter case, we refer to a pre-accelerated resin composition, which comprises the resin and the accelerator ingredients and can be stored until further use and cure with the peroxide. Another method involves the pre-preparation of an accelerator solution containing the accelerator ingredients, which solution can be stored until further use and addition to the resin. A pre-accelerated resin can be prepared by either adding the individual ingredients of the accelerator system to the resin or by adding these ingredients in admixture in the form of an accelerator solution.

Typical accelerator systems comprise a transition metal salt or complex. The most frequently used transition metal for this purpose is cobalt. However, legislation requires reduction of the amount of cobalt in view its toxicity.

As a result, there is a desire for the provision of Co-free accelerators. However, the Co-free accelerator systems that have been developed up to now do not have the good performance of the traditional Co-containing ones.

Examples of documents disclosing such Co-free accelerator systems are WO 2008/003492, WO 2008/003497, and WO 2008/003500. The metals used in the accelerator systems according to these documents—instead of Co—are Mn, Cu, Fe, and Ti. The disclosed accelerator systems are present in an unsaturated polyester or vinyl ester resin in the form of a pre-accelerated resin. This pre-accelerated resin is said to contain less than 0.01 mmol Co per kg resin.

It has now been found that the reactivity of accelerator systems based on iron can be enhanced by the addition of a reactivity booster. This reactivity booster is a transition metal salt or complex which is present in the accelerator system in a small amount compared to the iron compound.

The invention therefore relates to an accelerator solution suitable for forming a redox system with peroxides, comprising
(i) an iron compound selected from iron carboxylates, iron 1,3-dioxo complexes, and iron dicylcopentadienyl complexes, and
(ii) a compound of a second transition metal; the weight ratio of first transition metal:second transition metal being in the range 3:1 to 200:1,
with the proviso that the accelerator solution is essentially free of ascorbic acid.

The invention also relates to a pre-accelerated resin composition comprising
(i) a curable resin,
(ii) an iron compound selected from iron carboxylates, iron 1,3-dioxo complexes, and iron dicylcopentadienyl complexes, and
(iii) a compound of a second transition metal; the weight ratio of first transition metal:second transition metal being in the range 3:1 to 200:1,
with the proviso that the pre-accelerated resin is essentially free of ascorbic acid.

The invention further relates to a two-component composition comprising a first component and a second component, the first component comprising the pre-accelerated resin composition as defined above, the second component comprising a peroxide.

The iron compound is preferably present in the accelerator solution, determined as metal, in an amount of at least 50 mmol/l, more preferably at least 100 mmol/l. It is preferably present in the accelerator solution in an amount of less than 5000 mmol/l, more preferably less than 2500 mmol/l, and most preferably less than 1000 mmol/l.

The iron compound is preferably present in a pre-accelerated resin, determined as metal, in an amount of at least 1 mmol/kg resin, more preferably at least 2 mmol/kg resin. It is preferably present in an amount of not more than 75 mmol/kg resin, more preferably not more than 50 mmol/kg resin, even more preferably not more than 25 mmol/kg resin, and most preferably not more than 10 mmol/kg resin.

The iron compounds are selected from the group consisting of iron carboxylates, iron 1,3-dioxo complexes, and iron dicylcopentadienyl complexes.

Examples of suitable iron carboxylates are iron lactate, iron naphthenate, iron 2-ethyl hexanoate (i.e. iron octanoate), iron formiate, iron acetate, iron propionate, iron butyrate, iron pentanoate, iron hexanoate, iron heptanoateiron octanonate, iron nonanoate, iron decanoate, iron neodecanoate, and iron dodecanoate, Examples of iron 1,3-dioxo complexes are iron acetoacetonate, and the iron complexes of acetyl acetone, benzoyl acetone, dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate.

Examples of iron dicylcopentadienyl complexes are complexes comprising iron and two substituted or unsubstituted cyclopentadienyl ligands, wherein the optional substituents on the cyclopentadienyl ring are selected from the group consisting of alkyl, aryl, and aralkyl groups with 1 to 12 carbon atoms, which may be optionally substituted with heteroatoms selected from O, N, S, Si, and P. An example of a iron dicylcopentadienyl complex is ferrocene.

Both Fe(II) and Fe(III) complexes can be used.

Examples of the second transition metals, i.e. the reactivity boosters, are transition metals that can exist in two oxidation states, such as cobalt, titanium, vanadium, manganese, copper, tin, chromium, nickel, molybdenum, germanium, strontium, palladium, platinum, niobium, antimony, rhenium, osmium, iridium, platinum, gold, mercury, tellurium, rubidium, and bismuth.

Preferred second transition metals as reactivity boosters according to the present invention are copper, cobalt, and manganese. Cobalt compounds can be used as second transition metal (reactivity booster) without resulting in legislative and toxicity problems because of the small amounts that can be used.

Suitable compounds of the second transition metals are salts and complexes thereof, such as their halides, nitrate, sulphate, sulphonate, phosphate, phosphonate, oxide, or carboxylates. Examples of suitable carboxylates are lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate, or naphthenate.

The second transition metal is preferably present in the accelerator solution, determined as metal, in an amount of at least 10 mmol/l, more preferably at least 25 mmol/l. It is preferably present in the accelerator solution in an amount of less than 1000 mmol/l, more preferably less than 500 mmol/l, and most preferably less than 250 mmol/l.

The second transition metal is preferably present in a pre-accelerated resin, determined as metal, in an amount of at least 0.005 mmol/kg resin, more preferably at least 0.02 mmol/kg resin. It is preferably present in an amount of not more than 0.5 mmol/kg resin, more preferably not more than 0.25 mmol/kg resin.

Apart from the metal compounds, the accelerator solution according to the present invention contains a solvent. Examples of suitable solvents are phosphorous compounds and hydroxyl-functional solvents.

Examples of suitable phosphorous compounds are compounds with the formulae $P(R)_3$ and $P(R)_3=O$, wherein each R is independently selected from hydrogen, alkyl with 1 to 10 carbon atoms, and alkoxy groups with 1 to 10 carbon atoms. Preferably, at least two R-groups are selected from either alkyl groups or alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

The term "hydroxy-functional solvent" includes compounds of the formula $HO—(—CH_2—C(R^1)_2—(CH_2)_m—O—)_n—R^2$, wherein each $R^1$ is independently selected from the group consisting of hydrogen, alkyl groups with 1-10 carbon atoms, and hydroxyalkyl groups with 1 to 10 carbon atoms, n=1-10, m=0 or 1, and $R^2$ is hydrogen or an alkyl group with 1-10 carbon atoms. Most preferably, each $R^1$ is independently selected from H, $CH_3$, and $CH_2OH$. Examples of suitable hydroxy-functional solvents are glycols like diethylene monobutyl ether, ethylene glycol, diethylene glycol, dipropylene glycol, and polyethylene glycols, glycerol, and pentaerythritol.

In addition, the accelerator solution according to the present invention may further comprise additional organic compounds, such as aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odourless mineral spirit (OMS), aromatic hydrocarbon solvents such naphthenes and mixtures of naphthenes and paraffins, isobutanol; pentanol; 1,2-dioximes, N-methyl pyrrolidinone, N-ethyl pyrrolidinone; dimethyl formamide (DMF); dimethylsulfoxide (DMSO); 2,2,4-trimethylpentanediol diisobutyrate (TxIB); esters such as dibutyl maleate, dibutyl succinate, ethyl acetate, butyl acetate, mono- and diesters of ketoglutaric acid, pyruvates, and esters of ascorbic acid such as ascorbic palmitate; aldehydes; mono- and diesters, more in particular diethyl malonate and succinates; 1,2-diketones, in particular diacetyl and glyoxal; benzyl alcohol, and fatty alcohols.

The total amount of solvent that is preferably present in the accelerator solution is 1-50 wt %, preferably 5-30 wt %. In the pre-accelerator resin it is preferably 0.1-100 g/kg resin, preferably 0.5-60 g/kg resin.

The accelerator solution and the pre-accelerated resin according to the present invention are essentially free of ascorbic acid—meaning that the solution contains less than 1 wt % of ascorbic acid and the pre-accelerated resin contains less than 0.01 wt % ascorbic acid—because ascorbic acid tends to counteract the effect of the reactivity booster. In the presence of ascorbic acid, the second metal may act as an inhibitor instead of a reactivity booster.

Within this specification, the term ascorbic acid includes L-ascorbic acid and D-isoascorbic acid. Most preferably, neither the accelerator solution nor the pre-accelerated resin according to the present invention contains ascorbic acid.

The accelerator solution and the pre-accelerated resin according to the present invention may optionally contain one or more promoters, bases, water, inhibitors, additives, and/or fillers.

There are two important classes of promoters: carboxylate salts of ammonium, alkali metals, or alkaline earth metals and 1,3-diketones.

Examples of 1,3-diketones are acetyl acetone, benzoyl acetone, and dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate.

Examples of suitable metal carboxylate salts of ammonium, alkali metals, and alkaline earth metals are the 2-ethyl hexanoates (i.e. octanoates), nonanoates, heptanoates, neodecanoates, and naphthenates. The preferred alkali metal is K. The salts may be added to the accelerator solution or the resin as such, or they may be formed in situ. For example, alkali metal 2-ethyl hexanoates can be prepared in situ in the accelerator solution, after addition of the alkali metal hydroxide and 2-ethyl hexanoic acid to the solution.

Acetoacetates are particularly preferred promoters. Particularly preferred is diethyl acetoacetamide. Even more preferred is a combination of diethyl acetoacetamide and potassium 2-ethyl hexanoate.

If one or more promoters is/are present in the accelerator solution, their amount preferably is at least 0.01 wt %, more preferably at least 0.1 wt %, even more preferably at least 1 wt %, more preferably at least 10 wt %, and most preferably at least 20 wt %; preferably not more than 90 wt %, more preferably not more than 80 wt %, and most preferably not more than 70 wt %, all based on the total weight of the accelerator solution.

Suitable nitrogen-containing bases to be present in the accelerator solution and the pre-accelerated resin are primary, secondary, and tertiary amines such as triethyl amine, dimethylaniline, diethylaniline, or N,N-dimethyl-p-toludine (DMPT), polyamines such as 1,2-(dimethyl amine)ethane, secondary amines such as diethyl amine, ethoxylated amines such as triethanol amine, dimethylamino ethanol, diethanol amine, or monoethanol amine, and aromatic amines such as pyridine or bipyridine. The nitrogen-containing base is preferably present in the accelerator solution in an amount of 5-50 wt %. In the pre-accelerator resin it is preferably present in an amount of 0.5-10 g/kg resin.

The accelerator solution may optionally comprise water. If present, the water content of the solution preferably is at least 0.01 wt % and more preferably at least 0.1 wt %. The water content is preferably not more than 50 wt %, more preferably not more than 40 wt %, more preferably not more than 20 wt %, even more preferably not more than 10 wt %, and most preferably not more than 5 wt %, all based on the total weight of the accelerator solution.

The accelerator solution can be prepared by simply mixing the ingredients, optionally with intermediate heating and/or mixing steps. The iron complex can be added as complex to the solution or can be formed in-situ by adding the ligand and another iron salt to the solution. The pre-accelerated resin can be prepared in various ways: by mixing the individual ingredients with the resin, or by mixing the resin, including optional monomer, with the accelerator solution according to the present invention. The latter method is preferred.

Suitable resins to be cured using the accelerator solution according to the invention and to be present in the pre-accelerated resin composition include alkyd resins, unsaturated polyester (UP) resins, vinyl ester resins, (meth)acrylate resins, polyurethanes, epoxy resins, and mixtures thereof. Preferred resins are (meth)acrylate resins, UP resins and vinyl ester resins. In the context of the present application, the terms "unsaturated polyester resin" and "UP resin" refer to the combination of unsaturated polyester resin and ethylenically unsaturated monomeric compound. The term "(meth)acrylate resin" refers to the combination of acrylate or methacrylate resin and ethylenically unsaturated monomeric compound. UP resins and acrylate resins as defined above are common practice and commercially available. Curing is generally started by either adding the accelerator solution according to the invention and the initiator (peroxide) to the resin, or by adding the peroxide to the pre-accelerated resin.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Vinyl ester resins include acrylate resins, based on, e.g. methacrylate, diacrylate, dimethacrylate, and oligomers thereof.

Acrylate resins include acrylates, methacrylates, diacrylates and dimethacrylates, and oligomers thereof.

Examples of ethylenically unsaturated monomeric compounds include styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth) acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth) acrylate, trimethylolpropanetri(meth)acrylate, glycidyl (meth)acrylate, (bis)maleimides, (bis)citraconimides, (bis) itaconimides, and mixtures thereof.

The amount of ethylenically unsaturated monomer in the pre-accelerated resin is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

If an accelerator solution is used for curing a resin or for preparing a pre-accelerated resin, the accelerator solution is generally employed in amounts of at least 0.01 wt %, preferably at least 0.1 wt %, and preferably not more than 5 wt %, more preferably not more than 3 wt % of the accelerator solution, based on the weight of the resin.

Peroxides suitable for curing the resin and suitable for being present in the second component of the two-component composition include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. Preferred peroxides are organic hydroperoxides, ketone peroxides, peroxyesters, and peroxycarbonates. Even more preferred are hydroperoxides and ketone peroxides. Preferred hydroperoxides include cumyl hydroperoxide, 1,1,3,3-tetramethylbutyl hydroperoxide, tert-butyl hydroperoxide, isopropylcumyl hydroperoxide, tert-amyl hydroperoxide, 2,5-dimethylhexyl-2,5-dihydroperoxide, pinane hydroperoxide, para-menthane-hydroperoxide, terpene-hydroperoxide and pinene hydroperoxide. Preferred ketone peroxides include methyl ethyl ketone peroxide, methyl isopropyl ketone peroxide, methyl isobutyl ketone peroxide, cyclohexanone peroxide, and acetylacetone peroxide.

Of course, also mixtures of two or more peroxides can be used; for instance a combination of a hydroperoxide or ketone peroxide with a peroxyester.

A particularly preferred peroxide is methyl ethyl ketone peroxide. The skilled person will understand that these peroxides can be combined with conventional additives, for instance fillers, pigments, and phlegmatisers. Examples phlegmatizers are hydrophilic esters and hydrocarbon solvents. The amount of peroxide to be used for curing the resin is preferably at least 0.1 per hundred resin (phr), more preferably at least 0.5 phr, and most preferably at least 1 phr. The amount of peroxide is preferably not more than 8 phr, more preferably not more than 5 phr, most preferably not more than 2 phr.

When the peroxide is mixed with the pre-accelerated resin, is added to a pre-mix of resin and accelerator solution, or is pre-mixed with the resin after which accelerator solution is added. The resulting mixture is mixed and dispersed. The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

Other optional additives may be employed in the curing process, such as fillers, fibres, pigments, inhibitors, co-agents, and promoters.

Examples of fibers are glass fibers, carbon fibers, aramid fibres (e.g. Twaron®), natural fibers (e.g. jute, kenaf, industrial hemp, flax (linen), ramie, etc.).

Examples of fillers are quartz, sand, aluminium trihydroxide, magnesium hydroxide, chalk, calcium hydroxide, clays, and lime.

The cured resin can be subjected to a post-cure treatment to further optimize the hardness. Such post-cure treatment is generally performed at a temperature in the range 40-180° C. for 30 min to 15 hours.

The cured resins find use in various applications, including marine applications, chemical anchoring, roofing, construction, relining, pipes and tanks, flooring, windmill blades, laminates, etc.

EXAMPLES

Reference Example

Four Fe-containing accelerator solutions were prepared by dissolving 1 wt % of an iron compound in triethyl phosphate (TEP); the iron compounds used are listed in Table 1. As a further reference, a commercially available Accelerator NL-53 (ex-AkzoNobel), comprising cobalt (II) 2-ethylhexanoate in an amount of 10 wt % Co (as metal) was used.

These accelerator solutions—2 phr (per hundred resin)—were used to cure an ortho phthalic acid-based unsaturated polyester resin (Palatal® P6 ex DSM resin) at 20° C. with 1.5 phr methyl ethyl ketone peroxide (Butanox® M50, ex-AkzoNobel). The curing performance was analysed by the method of the Society of Plastic Institute (SPI method F/77.1; available from Akzo Nobel Polymer Chemicals). This method involves measuring the peak exotherm, the time to peak, and the gel time. According to this method, 25 g of a mixture comprising 100 parts of resin, 1.5 parts of peroxide, and 2 parts of accelerator solution were poured into a test tube and a thermocouple was placed through the enclosure at the centre of the tube. The glass tube was then placed in a climate controlled room maintained at 20° C. and the time-temperature curve was measured. From the curve the following parameter was calculated:

Gel time (Gt)=time in minutes elapsed between the start of the experiment and 5.6° C. above the bath temperature.

The results are displayed in Table 1, which show that these iron solutions are not capable of accelerating cure in this system.

TABLE 1

|  | Gt | cure |
| --- | --- | --- |
| Accelerator NL-49P | 12 min | + (good cure) |
| Fe(II) octanoate | >70 hrs | − (no cure, no gel) |
| ferrocene | >70 hrs | − (no cure, no gel) |
| Fe(III) acetylacetonate | >70 hrs | − (no cure, no gel) |
| Fe(II) acetylacetonate | >70 hrs | − (no cure, no gel) |

Example 1

The above Reference Example with 1 wt % iron octanoate/TEP was repeated, except that a small amount of a second metal compound was added to the resin. Table 2 presents the results and shows that a small amount of an additional metal compound results in a huge increase in curing activity. That this increase is not simply due to the additional metal is proven by the fact that, when repeating the experiment with the same amount of Accelerator NL-53 without the iron octanoate, the cure required 18 minutes. In other words: it is a synergistic effect of the iron compound and the small amount of second metal that gives the good results.

TABLE 2

| Second metal compound | Amount ($10^{-3}$ phr, as metal) | Gt | cure |
| --- | --- | --- | --- |
| none | — | >70 hrs | − |
| Acc. NL-53 (10 wt % Co) | 0.90 | 11 min | + |
| Acc. 553 (1.7 wt % Co, 0.3 wt % Cu) | 0.18 | 14 min | + |
| Acc. 383 (3.9 wt % Co, 0.16 wt % Cu) | 0.36 | 6 min | + |
| Acc NL-23 (3 wt % Co) | 0.27 | 4 min | + |
| Cu(I)Cl (5 wt % Cu) | 0.45 | 10 min | + |
| Polycure (1 wt % Mn) | 0.09 | 3 min | + |

Example 2

Example 1 was repeated with different iron compounds (all 1 wt % iron compound/TEP).

Table 3 present the results and confirms the results obtained in Example 1 also for other iron compounds.

TABLE 3

| Iron compound | Amount of iron compound (phr) | Second metal compound | Amount second metal ($10^{-3}$ phr, as metal) | Gt | cure |
| --- | --- | --- | --- | --- | --- |
| Ferrocene | 2 | Co | 0.9 | 13 min | + |
| Fe(III) acetoacetonate | 2 | Co | 0.9 | 5 min | + |
| Fe(III) acetoacetonate | 2 | Mn | 0.09 | 3 min | + |
| Fe(III) acetoacetonate | 2 | Co | 0.19 | 9 min | + |
| Fe(III) acetoacetonate | 2 | Co | 0.045 | 38 min | + |
| Fe(II) acetoacetonate | 2 | Co | 0.9 | 8 min | + |
| Fe(II) acetoacetonate | 2 | Co | 0.18 | 17 min | + |
| Fe(II) acetoacetonate | 2 | Co | 0.2 | 15 min | + |
| Fe(II) acetoacetonate | 2 | Mn | 0.05 | 18 min | + |
| Fe(II) acetoacetonate | 2 | Cu(I) | 0.3 | 141 min | + |

The invention claimed is:

1. An accelerator solution suitable for forming a redox system with peroxides, comprising:
    an iron compound selected from the group consisting of iron carboxylates, iron 1,3-dioxo complexes, and iron dicylcopentadienyl complexes,
    (ii) a compound of a second transition metal; the weight ratio of iron:second transition metal being in the range of 3:1 to 200:1, and
    (iii) a solvent selected from the group consisting of diethyl phosphate, dibutyl phosphate, tributyl phosphate, triethyl phosphate, and dibutyl phosphite,
    wherein the second transition metal is Co or Mn, and with the proviso that the accelerator solution contains less than 1 wt % of ascorbic acid.

2. The accelerator solution according to claim 1, wherein the iron compound is present in the solution, determined as metal, in an amount of 50-5000 mmol/l.

3. The accelerator solution according to claim 1, wherein the second transition metal is present in the solution in an amount of 10-1000 mmol/l.

4. The accelerator solution according to claim 1, further comprising an alkali or alkaline earth metal compound, a second phosphorous-containing compound, and/or a 1,3-diketone.

5. A two component composition comprising a first component and a second component, the first component comprising a pre-accelerated resin composition comprising
(i) a curable resin,
(ii) an iron compound selected from the group consisting of iron carboxylates, iron 1,3-dioxo complexes, and iron dicyclopentadienyl complexes,
(iii) a compound of a second transition metal; the weight ratio of iron:second transition metal being in the range of 3:1 to 200:1,
wherein the second transition metal is Co or Mn, and
(iv) a solvent selected from the group consisting of diethyl phosphate, dibutyl phosphate, tributyl phosphate, triethyl phosphate, and dibutyl phosphite,
with the proviso that the pre-accelerated resin contains less than 0.01 wt % of ascorbic acid, and
the second component comprises a peroxide selected from the group consisting of organic hydroperoxides, ketone peroxides, peroxycabonates, and peroxyesters.

6. The two-component composition according to claim 5, wherein the iron compound is present in the pre-accelerated resin, determined as metal, in an amount of 1-75 mmol/kg resin.

7. The two-component composition according to claim 5, wherein the second transition metal is present in the pre-accelerated resin, determined as metal, in an amount of 0.005-0.5 mmol/kg resin.

8. The two-component composition according to claim 5, wherein the pre-accelerated resin further comprises an alkali or alkaline earth metal compound, a second phosphorous-containing compound, and/or a 1,3-diketone.

9. The two-component composition according to claim 5, wherein the curable resin is an unsaturated polyester resin, a vinyl ester resin, or a (meth)acrylate resin.

10. A pre-accelerated resin composition comprising:
(i) a curable resin,
(ii) an iron compound selected from the group consisting of iron carboxylates, iron 1,3-dioxo complexes, and iron dicyclopentadienyl complexes,
(iii) a compound of a second transition metal; the weight ratio of iron:second transition metal being in the range of 3:1 to 200:1,
wherein the second transition metal is Co or Mn, and
(iv) a solvent selected from the group consisting of diethyl phosphate, dibutyl phosphate, tributyl phosphate, triethyl phosphate, and dibutyl phosphite,
with the proviso that the pre-accelerated resin contains less than 0.01 wt % of ascorbic acid.

11. The pre-accelerated resin composition according to claim 10, wherein the iron compound is present in the pre-accelerated resin, determined as metal, in an amount of 1-75 mmol/kg resin.

12. The pre-accelerated resin composition according to claim 10, wherein the second transition metal is present in the pre-accelerated resin, determined as metal, in an amount of 0.005-0.5 mmol/kg resin.

13. The pre-accelerated resin composition according to claim 10, wherein the pre-accelerated resin further comprises an alkali or alkaline earth metal compound, a second phosphorous-containing compound, and/or a 1,3-diketone.

14. The pre-accelerated resin composition according to claim 10, wherein the curable resin is an unsaturated polyester resin, a vinyl ester resin, or a (meth)acrylate resin.

* * * * *